United States Patent Office 3,696,046
Patented Oct. 3, 1972

3,696,046
NITRO OR NITROSO AROMATIC COMPOSITION
Donald M. Fenton, 2861 Alden Place,
Anaheim, Calif. 92806
No Drawing. Filed Aug. 20, 1970, Ser. No. 65,720
Int. Cl. C07b 3/00; C07c 79/10
U.S. Cl. 252—186          10 Claims

ABSTRACT OF THE DISCLOSURE

The oxidation of organic compounds using a nitro or nitroso aromatic as an oxidant in the presence of a non-aqueous reaction medium containing a ruthenium or rhenium catalyst and alkaline conditions is disclosed. Preferably, the catalytically active metal is in complex association with a biphyllic ligand. Examples of oxidizable substrates are aryl and alkyl substituted aromatics; condensed ring aromatics; phenols; olefins; alkynes; saturated hydrocarbyl alcohols, ketones, aldehydes, halides, ethers, amines and carboxylic acids and halides and alkyl esters thereof; and heterocyclic amines. The oxidation is performed under relatively mild conditions including temperatures from 50° to 350° C. and pressures from 0.1 to 1000 atmospheres.

DESCRIPTION OF THE INVENTION

This invention relates to oxidation of organic compounds and, in particular, relates to an oxidizing composition useful for converting organic compounds to more valuable materials. This invention also relates to the preparation of N-aryl substituted aromatic amines, which are useful as antioxidants, using the oxidizing compositions of this invention.

It has been discovered that nitro or nitroso aromatic compounds can function as oxidizing agents for organic compounds under relatively mild conditions when in the presence of a ruthenium or rhenium containing catalyst and strongly alkaline base. While this oxidation has general applicability to the oxidation of organic compounds, it is of particular value with regard to the oxidation of tetralin and/or naphthalene to prepare naphthyl amine derivatives which are useful as rubber antioxidants.

N-phenyl-alpha-naphthylamine is used as a rubber oxidant and it is commonly prepared by sulfonation of naphthalene to prepare naphthalene sulfonic acid which is treated in the presence of the strong base to obtain alpha-naphthol which is condensed with aniline to obtain the desired product. Aniline is commonly obtained by the reduction of nitrobenzene.

The oxidizing agents of my invention can be used to obtain the desired product from tetralin and/or naphthalene by oxidizing tetralin or naphthalene with nitroso or nitrobenzene in the presence of the catalyst and, under the conditions described herein, to prepare the N-phenyl-alpha-naphthylamine in substantial quantities. The reaction can also be performed to obtain N-phenylnaphthylimines which can be hydrogenated to yield N-phenylnaphthylamines having one or more amino groups on the naphthalene nucleus by the use of high ratios of the oxidant to the tetralin reactant.

The oxidant compositions which are useful for treatment of the oxidizable substrates in accordance with this invention comprise a nitro or nitroso aromatic compound, catalytic amounts of a ruthenium or rhenium containing catalyst and a strongly alkaline base. The nitro or nitroso aromatic can be used in substantial quantities and can comprise the reaction solvent for the oxidation or, if desired, the oxidizable substrate can be used in excess quantities and alone or together with the nitro aromatic form a suitable liquid reaction phase. When the nitro or nitroso aromatic and/or the oxidizable substrate are solids at ambient or reaction conditions, it may be convenient to dissolve the nitro aromatic in a suitable inert solvent such as an alkane hydrocarbon.

The oxidation occurs with reduction of the nitroamomatic to an aminoaromatic. The nitroaromatic is thus progressively reduced with formation of a nitrosoaromatic as an intermediate oxidant. Because of their availability, stablity and relatively low cost, the nitroaromatics are preferred however, the invention can also be practiced by use of the corresponding nitrosoaromatic.

The nitro or nitroso aromatic compound which is the oxidant can, in general, be any nitro or nitroso mono-, bi- or tricyclic aromatic. The compound can have from one to about three nitro or nitroso groups and up to about four other substituent groups which do not deactivate or inhibit the oxidizing capacity of the nitro or nitroso aromatic compound. Examples of such groups are hydroxy, acyloxy, acyl, carboxy, alkoxy carbinol, alkyl amido and halo groups. The nitro or nitroso aromatic compound therefore has the following structure:

$$(R)_m(NO_x)_nAr$$

wherein:

Ar is monocyclic, bicyclic or tricyclic aromatic, e.g., phenyl, naphthyl, anthryl or phenanthryl;
$x$ is 1 or 2;
$n$ is from 1 to 3;
$m$ is from 0 to 3; and
R is the same or different group selected from: hydrogen, hydroxy, halo, or $C_1$ to about $C_8$ acyloxy or alkyl, or alkoxycarbinol.

Suitable nitro aromatic compounds have from 6 to about 20 carbons and can have side chain substituents containing up to about 8 carbons. Examples of suitable nitro aromatic compounds that can be used include nitrobenzene, 1,2-dinitrobenzene, 1,4-dinitrobenzene, 1,3,5-trinitrobenzene, alpha-nitronaphthalene, 1,3-dinitronaphthalene, 2,6-dinitronaphthalene, 1,4,6-trinitronaphthalene, 1-nitroanthracene, 1,4 - dinitroanthracene, 1,5 - dinitroanthracene, 1,7-dinitroanthracene, 1,4,6-trinitroanthracene, 3-nitrophenanthrene, 1 - nitrophenanthrene, 3,8 - dinitrophenanthracene, 1,3,8-trinitrophenanthrene, p-nitrotoluene, m-nitrotoluene, 3,5-dinitrotoluene, 2,3,5-trinitrotoluene, 2-nitro-p-xylene, 3,5-dinitro-o-xylene, 3-nitropseudocumene, p-nitrocumene, o - nitrocumene, 3,5 - dinitrocumene, p-nitrododecylbenzene, o-nitrododecylbenzene, 2,4, 6-trinitroisooctylbenzene, 4-nitro - 1 - methylnaphthalene, 2,7-dinitro-1-methylnaphthalene, 4-nitro - 1,2 - dimethylnaphthalene, 8-nitro-1,2-dipropylnaphthalene, 4,8-dinitro-1,2-diamylnaphthalene, 8-nitro-1-octylnaphthalene, 3,6-dinitro-2-octylnaphthalene, 2-nitro-1 - isopropylanthracene, 6,7-dinitro-1-amylanthracene, 3 - nitro - 1 - butylphenanthrene, 1,3-dinitro-7-amylphenanthrene, m-nitrophenol, 6-nitro-1-naphthol, 6,8-dinitro-2-naphthadiol, 4-nitro-1-anthranol, p-nitroanisole, 2,5-dinitro-1,4-diethoxybenzene, 2,6-dinitro-1-octylnaphtholether, p-nitroacetophenone, m-nitroacetophenone, o-nitrocaproylbenzene, 2,7-dinitro-1-acetonaphthalene, 7-nitro-3-caproylphenanthrene, methyl p-nitrobenzoate, butyl 1-nitro-2,6-naphthadioate, propyl 4-nitrotrimellitate, amyl 6-nitro-alpha-anthranoate, ethyl p-nitrobenzoate, isopropyl-alpha(2 - nitronaphthenoate), octyl-1-(4 - nitroanthranoate), m - nitroacetanilide, 1-3-nitronaphthyl caproamide, p-nitrobromobenzene, o-nitrobromobenzene, 2-nitro-p-dichlorobenzene, 4-nitro-1,3,5-trifluoronaphthalene, 3-nitro-1,2,4,5 - tetraiodoanthracene, etc.

Useful nitroso compounds include: nitrosobenzene, 1,2-dinitrosobenzene, nitrosonaphthalene, nitrosoanthracene, nitrosophenanthrene, p-nitrosotoluene, 2-nitroso-p-xylene, nitrosocumene, 4-nitroso-1,2-dimethylnaphthalene, etc.

Of the aforementioned, the preferred are the nitroaromatic oxidants and of these, the most preferred are the unsubstituted nitroaromatic compounds. The substituted nitro or nitroso aromatic compounds can undergo self-oxidation which leads to byproducts in the reaction product that may be undesired. Accordingly, the unsubstituted nitro aromatic hydrocarbons, i.e., wherein $m$ is 0, as described herein, are preferred.

The catalyst for the oxidation is a ruthenium or rhenium containing catalyst. The exact nature of the catalyst and the catalytically active valence state of these metals is not known with certainty. The catalyst can be present in the oxidant composition in an amount from 0.01 to about 10 weight percent, expressed as the metal. The actual concentration is not critical since the metal functions catalytically and concentrations of from 0.1 to about 5.0 weight percent are preferred. The reaction is an oxidation reduction and it is most likely that the metal participates in the oxidation mechanism. Accordingly, the metal undoubtedly exists in a plurality of oxidation states (valences) during the reaction and, indeed, metallic precipitates have been observed as being formed during a reaction when only soluble metal salts were initially charged to the reaction.

The complexity of the possible oxidation states of these metals make prediction of its catalytic reactive state more difficult, e.g., rhenium is known to form compounds with a valence of the rhenium from −7 to +7 and all these oxidation states of the metal are possible as catalytically active forms. Similarly, ruthenium compounds are known wherein ruthenium has a valence from −2 to +8 and again all these oxidation states are possible in the catalyst used in this invention.

Since an oxidation-reduction is involved and the metal participates therein, it is not surprising to find that the exact state of the metal when added to the oxidation medium does not substantially affect the reaction. While it is generally true that addition of the metal in a soluble form, resulting in homogeneous catalysis, achieves the fastest rate of reaction, insoluble states of the catalyst, i.e., heterogeneous catalysis, can also be used. Thus, insoluble forms such as the powdered metal, oxide, etc., can also be added to the reaction medium.

The ruthenium or rhenium can therefore be added to the reaction zone in any suitable form, e.g., as the metal or as a compound such as a complex, a salt or an oxide. Examples of suitable forms of the metals include ruthenium and rhenium salts, e.g., salts of strong inorganic acids such as nitric, hydrohalic, sulfuric, etc., or of aliphatic and aromatic carboxylic acids having up to about 12 carbons such as acetic, valeric, octanoic, benzoic, naphoic, phthalic, acids, etc.

Specific examples of these are: ruthenium nitrate, ruthenium chloride, rhenium nitrate, rhenium bromide, ruthenium iodide, rhenium fluoride, ruthenium sulfate, rhenium sulfate, ruthenium oxide, rhenium oxide, rhenium benzoate, rhenium acetate, rhenium hexanoate, ruthenium decanoate, potassium hexacyanoruthenate, tetraaminohydroxy-chlororuthenium chloride, ammonium perrhenate, potassium perrhenate, sodium perrhenate, calcium perrhenate, rhenium decacarbonyl, rhenium heptasulfide, rhenium oxytetrachloride, rhenium trioxychloride, etc.

When the metal components are added in the metalic state, they can be added as a powder in finely subdivided form or can be distended on a suitable inert support by impregnating the support with any of the aforementioned sources of ruthenium or rhenium. Examples of suitable inert supports include activated carbon, alumina, silica, aluminosilicates, titania, zirconia, etc. Such supports should be inert to the catalyst, reactants and products under the reaction conditions. In addition, the solids should preferably be finely subdivided, e.g., have particle sizes passing about 20 mesh but retained on about 400 mesh standard screen size and can have specific surface areas from about 10 to about 10,000 square meters per gram.

The third component of the oxidant composition comprises the alkaline material which can be an alkali metal or alkaline earth metal hydroxide or ammonia. Examples of these alkaline materials include sodium hydroxide, potassium hydroxide, ammonium hydroxide (aqua ammonia), lithium hydroxide, rubidium hydroxide, calcium hydroxide, barium hydroxide, magnesium hydroxide, etc.

The alkaline material should be employed in amounts sufficient to impart a basic condition to the reaction medium. In general, amounts from about 0.01 to about 20, preferably from about 1 to about 5 weight percent of the oxidant composition can be employed.

In its preferred state, the catalytic metal, i.e., ruthenium or rhenium, is complexed with a biphyllic ligand. The biphyllic ligand is a compound of phosphorus or arsenic having at least one atom with a pair of electrons capable of forming a coordinate covalent bond with a metal atom and simultaneously having the ability to accept one electron from the metal, thereby imparting additional stability to the resulting complex. Biphyllic ligands can comprise organic compounds having at least about 3 carbons and containing arsenic or phosphorus in a trivalent state of containing pentavalent phosphine oxide or arsine oxide. Of these, the phosphorus compounds are most preferred, e.g., the phosphines or phosphine oxides. However, the arsine compounds can also be employed. In general, these biphyllic ligands have the following structure:

$$E(R)_3 \text{ or } O=E(R)_3$$

wherein:

E is arsenic or phosphorus;
R is the same or different hydrocarbyl group selected from the class consisting of aryl having from 6 to about 10 carbons and alkyl having from 1 to about 10 carbons; and
at least one of said R groups is aryl. Preferably at least two and, most preferably, all three of the R groups are aryl.

Examples of suitable biphyllic ligands having the aforementioned structure and useful in my invention with the ruthenium or rhenium are the following: phenyldimethyl phosphine; phenyldiethylphosphine oxide; diphenylethylarsine; diphenylpropylarsine oxide; phenyldibutylarsine; phenyldioctylarsine oxide; cumyldiisopropylphosphine, cumyldimethylphosphine oxide; dixylylhexylphosphine; dixylylamylphosphine oxide; triphenylphosphine; triphenylphosphine oxide; trilaurylarsine; trilaurylarsine oxide; tridurylphosphine; phenyldiisopropylarsine; phenyldiamylphosphine; diethylnaphthylphosphine; dimethylnaphthylphosphine oxide; p-hexylphenyldixylylphosphine; etc.

The biphyllic ligand can be used in amounts from about 0.5 to about 100 times the stoichiometric equivalent of the ligand which is in complex association with the ruthenium or rhenium. Generally, the complex can contain from about 1 to about 3 ligands per atom of the metal. Preferably, the amount of biphyllic ligand employed is in excess of the stoichiometric equivalent of that contained in the metal complex in excess quantities from about 2 about 100 times the stoichiometric amount can be used.

The organic substrate which can be oxidized in accordance with this invention can be any of a plurality of compounds such as aryl and alkyl substituted aromatics; condensed ring aromatics; phenols; olefins; alkynes; saturated hydrocarbyl alcohols, ketones, aldehydes, halides, ethers, amines and carboxylic acids and halides and alkyl esters thereof; and heterocyclic amines. The size and complexity of the oxidizable substrate does not significantly affect its susceptibility to oxidation by the nitroaromatic system of this invention. The substrate can have from 2 to about 25 carbons, preferably from about 2 to 18 carbons.

Examples of oxidizable aromatics are the condensed ring aromatics such as naphthalene, acenaphthene, fluorene, anthracene, phenanthrene, naphthacene, crysene, pyrene, as well as aryl substituted aromatics such as diphenyl, 1-phenylnaphthalene, 9-phenylanthracene, 9,10-diphenylphenanthrene, 9-phenylanthracene, etc.

Examples of phenols comprise: phenols, cresols, xylenols, mesitol, durenol, thymol, catechol, resorcinol, quinol, orcinol, homopyrocatechol, dihydroxyxylol, mexorcinol, thymoquinol, pyrogallol, phloroglucinol, methylpyrogallol, tetrahydroxybenzene, phenanthrol, anthrol, naphthol, 2,6-naphthdiol, etc.

Examples of olefins include alkenes such as propylene, butene, isobutylene, pentene, 2-ethylhexene, octene, nonene, decene, 1-phenyl-3-butene, 3-cyclohexyl-1-butene, styrene, allylbenzene, dodecenylbenzene, eicosene, etc.; monocyclic alkenes with 3 to about 8 cyclic carbons such as cyclobutene, cyclopentene, octylcyclopentene, methylcyclopentene, amylcyclopentene, cyclohexene, heptylcyclohexene, cycloheptene, etc.; or bicycloalkenes having from 6 to about 10 cyclic carbons such as $\Delta^2$-bicyclo[1.1.3]heptene,
2.7.7-trimethyl-$\Delta^2$-bicyclo[1.1.3]heptene,
$\Delta^2$-bicyclo[2.2.1]heptene,
1-isopropyl-4-methyl-$\Delta^2$-bicyclo[3.1.0]hexene,
$\Delta^4$-bicyclo[2.2.2]octene, etc.

Polyolefinic alkenes having up to about 3 unsaturated, conjugated or nonconjugated sites can also be oxidized such as butadiene, isoprene, 1,3,5-decatriene, 1,5,9-heptatriene, etc.

Alkynes are also oxidizable substrates and illustrative examples include propyne, butyne, pentyne, 2-ethyl-hexyne, dodecyne, octadecyne, eicosyne, etc.

Examples of saturated hydrocarbyl alcohols include the mono, di and trihydroxy substituted alkanes such as ethanol, propanol, isopropanol, butanol, pentanol, 2-ethylhexanol, decanol, dodecanol, hexadecanol, eicosanol, tetraeicosanol, glycol, glycerine, trimethylene glycol, hexamethylene glycol, pentamethylene glycol, 1-amylglycerine, 1,3-diphenylglycerine, etc. Other oxidizable alcohols are the mono, di or trihydroxy substituted cycloalkanes having from 3 to about 12 cyclic carbons such as cyclododecanediol, cyclodecanol, cycloheptanol, cyclohexanediol, cyclohexanol, cyclooctanol, cyclopentanetriol, cyclopropanol, cyclobutanol, 3-octylcyclododecan-1-ol, etc.

Examples of saturated hydrocarbyl ketones include aliphatic ketones such as acetone, methyl ethyl ketone, diethyl ketone, methyl isobutyl ketone, di-iso-propyl ketone, diamyl ketone, dihexyl ketone, ethyl heptyl ketone, octyl decyl ketone, etc. Also included are cyclic ketones having from 3 to 12 cyclic carbons such as cyclobutanone, cyclododecanedione, cyclododecanone, cycloheptanone, cyclohexanedione, cyclononanone, cyclooctanone, cyclopentadecanone, cyclopentanone, cyclopropanone, decylcyclopentanone, etc.

Examples of saturated hydrocarbyl aldehydes include acetaldehyde, propionaldehyde, valeraldehyde, isobutyraldehyde, caproic, caprylic decanoic octadecanoic aldehyde, benzaldehyde, cyclohexylcarbinal, 3-cyclopentylvaleraldehyde, etc.

Examples of saturated hydrocarbyl halides include the alkyl halides such as chloroethane, difluoropropane, chlorofluoroethane, chlorobutane, diiodopentane, chlorooctane, bromotetradecane, trichloroeicosane, tetrafluorotetraeicosane, alpha - chloroethylbenzene, bromobutane, hexachlorohexane, etc. Also included are the cycloalkyl halides having from 3 to about 12 cyclic carbons such as fluorocyclopropane, dichlorocyclobutane, 3 - bromo-1-methylcyclopentane, diiodocyclohexane, chlorocycloheptane, 4 - chloro - 1 - amylcyclooctane, 2,3-difluoro-1,4-dihexylcyclohexane, etc.

Saturated hydrocarbyl ethers can also be oxidized such as alkyl and cycloalkyl (having from 3 to about 12 cyclic carbons) ethers. Examples include: diethyl ether, dicyclopropyl ether, methyl ethyl ether, cyclohexyl methyl ether, diisopropyl ether, dibutyl ether, decyl isopropyl ether, pentyl eicosanyl ether, etc.

Oxidizable amines include the primary, secondary or tertiary alkyl amines or the $C_3$ to about $C_{12}$ alicyclic and heterocyclic amines. Examples of the alkyl amines are: ethyl amine, dibutyl amine, triisopropyl amine, diamylamine, 2 - ethylhexyl amine, triheptyl amine, diisooctyl amine, decylamine, didodecylamine, eicosylamine, etc.

Examples of oxidizable saturated hydrocarbyl carboxylic acids and halides thereof include alkyl carboxylic acids such as acetic acid, acetyl chloride, propionic acid, propionyl chloride, valeric acid, octanoic acid, 2 - ethylhexanoic acid, decanoic acid, lauric acid, butyryl fluoride, stearic acid, heptanoyl bromide, nonadecanoic acid, eicosanoyl iodide, malonoyl dichloride, succinic acid, glutaroyl difluoride, adipic acid, pimelic acid, suberoyl dibromide, etc. Also oxidizable are acids and acid halides which have alicyclic or aryl substituents such as cyclohexyl carbonyl chloride, phenylacetic acid, 4 - cyclohexylpentanoic acid, etc.

The $C_1$ to about $C_{12}$ alkyl esters of the aforementioned acids can also be oxidized and examples include ethyl acetate, dodecyl propionate, valeryl decanoate, octyl stearate, hexyl pentadecanoate, ethyl laurate, dioctyl oxalate, diisopropyl adipate, diamyl succinate, etc.

Examples of heterocyclic amines include those having 5 to 6 member hetero-rings as well as 9 or 10 member condensed hetero-rings with from 1 to about 3 hetero nitrogens. Examples of these are pyrrole, pyrroline, pyrrolidine, isopyrrole, isopyrroline, pyrazole, pyrazolidine, imidazole, imidazoline, triazole, triazoline, triazolidine, isotriazole, piperidine, isoidole, idolenine, pyridine, benzotriazole, quinoline, cinnoline, etc.

The saturated hydrocarbyl and heterocyclic amines are generally sufficiently basic that the requirement for an alkaline component of the oxidant system is satisfied by the amine and no extra alkaline material need be added.

A particularly useful substrate that can be oxidized comprises the alkyl aromatics. This class of oxidizable substrates can include mono-, di- or tricyclic aromatics having up to about 25 carbons with alkyl substituents having from 1 to about 16 carbons. These can be entirely hydrocarbon compounds or can bear a substituent such as oxo or halo. Examples of such alkyl aromatics include chlorotoluene, fluoroxylene, tetralone, dihydroanthranone, bromooctylbenzene, bidoindane, indanone, etc. A preferred class are the hydrocarbon alkyl aromatics which correspond to the following formula:

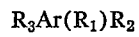

wherein:

no more than two of said $R_1$, $R_2$ and $R_3$ are hydrogen and the remainder are the same or different alkyl having from 2 to about 16 carbons or wherein two of said groups together form a single alkylene having 3 or 4 carbons; and at least one of said R groups has at least one hydrogen on the alpha carbons, i.e., the carbon vicinal to the aromatic nucleus.

Examples of the preferred oxidizable alkyl aromatics therefore, include: toluene, xylene, ethylbenzene, pseudocumene, cumene, durene, octylbenzene, 1,3 - dipropylbenzene, m - hexyl-toluene, 1 - decyl - 2 - ethyl - 5 - propylbenzene, indane, tetralin, dihydronaphthalene, 2,6-dimethylnaphthalene, 1,7 - diisobutylnaphthalene, 1 - decyl-naphthalene, 2 - isooctylnaphthalene, dihydroanthracene, 1 - hexylanthracene, dihydroanthracene, dipropylanthracene, 1 - isoamyl - 5 - methylanthracene, dihydrophenanthrene, isopropylphenanthrene, etc. Of the aforementioned oxidizable substrates, tetralin comprises a preferred material because of the established market value of its oxidized derivatives, e.g., the N - phenylnaphthylamines which can be obtained when nitrobenzene is used as the oxidant.

With the $C_2$ and higher alkyl substituents, it is believed that the oxidation proceeds by the dehydrogenation of the carbons in the alpha and beta positions to the aromatic substrate. The presence of the resulting unsaturated bond in the alkyl substituent renders the vicinal carbon slightly positive and susceptible to alkaline oxidative reaction. The next stage of the oxidation is believed to comprise oxidation of the carbon adjacent to the unsaturated beta carbon to form an alcohol. With the methyl substituents, it is believed that this oxidation occurs directly. The alcohol can react in the presence of an amine to form a secondary amine or can undergo further oxidation to an aldehyde or ketone. The aldehyde or ketone can react with any amine present in the reaction zone to form an imine or can undergo further oxidation to a carboxylic acid or amide. The products produced by this oxidation, therefore, vary considerably with the identity of the substrate, the identity of the nitroaromatic oxidant, as well as with the degree of oxidation employed.

The oxidation of alkyl halides is believed to proceed with an initial dehydrohalogenation step to form an olefin with ensuing oxidative attack on the olefin carbons similar to that described above. The olefins can be dehydrogenated to yield further unsaturated compounds, polyolefins or can be oxidized, as previously described, by alkaline oxidative reaction to form an aldehyde or ketone, resulting ultimately in an amide bearing a saturated or an unsaturated N-substituent. The remainder of the oxidizable substrates are also oxidized, entering the aforedescribed sequence of oxidation at their respective oxidation states. Thus the hydroxycyclohexanes are oxidized similarly to the phenols; the alkyl amines similarly to the aromatic amine, etc. Alternatively, the oxidation can be terminated before complete oxidation is achieved so that any of the intermediates along this progressive path of oxidation can be recovered as desired.

The reaction is performed under relatively mild conditions including temperatures from about 30° to 300° C., preferably from about 150° to about 250° C. Sufficient pressure is used to maintain the reaction medium in liquid phase and pressures from about 1 to about 1000 atmospheres can be employed. The preceding conditions are maintained by conventional means. Since the reaction is exothermic, the reaction temperature can be maintained by suitable cooling of all or a portion of the reaction zone contents using heat exchange surfaces such as cooling coils which can be installed in the reaction zone, or which can be used externally by continuously or intermittently removing all or a portion of the reaction zone contents and passing the withdrawn portion into contact with the heat exchange surfaces and returning the resultant cooled reaction medium to the reaction zone. The pressure can be the autogenic pressure resulting from the confinement of the reactants at the reaction temperature or, if desired, a suitable inert gas such as nitrogen or carbon dioxide can be charged to the reaction zone to maintain the desired pressure.

The process can be conducted continuously or batchwise, however, continuous processing is preferred. In the latter technique, the oxidant composition of the catalyst, oxidant and base are passed to the reaction zone, neat or admixed with a suitable inert organic liquid, and the oxidizable substrate is introduced into contact with the reaction medium and catalyst in the reaction zone.

Relative molar proportions of oxidant composition and oxidizable substrate can be from about 1:10 to about 10:1. The relative proportions employed will, of course, influence the reaction and nature of the product. When fully oxidized products are desired, the higher ratios of oxidant to substrate are used, e.g., ratios from about 1:1 to about 10:1. When products of intermediate oxidation are desired, the ratio should be less, e.g., from about 10:1 to 1:1. Preferred ranges within these broadly defined groupings are from about 2:1 to about 5:1 and from 1:5 to about 2:1.

A continuous withdrawal of the liquid phase in the reaction zone can be employed; this material can then be cooled and distilled to recover the desired products. Because the reaction conditions are mild, the reaction products can also be permitted to remain in the reaction zone without encountering undue degradation to less desired products. Therefore, batchwise operation can also be practiced by admixing the oxidizable substrate, catalyst, nitro or nitroso aromatic oxidant and base in any inert solvent that may be employed in the reaction zone and continuing the reaction therein until a sufficient inventory of product is accumulated. Thereafter, the reaction can be discontinued and the product can be recovered by suitable steps, typically distillation. In many cases water is formed as a by-product and can be continuously removed or allowed to remain.

The invention will now be illustrated by the following examples:

Example 1

A 500 milliliter flask equipped with a Dean Stark trap is charged with 0.5 gram ammonium perrhenate, 1 gram potassium hydroxide, 3 grams triphenylphosphine, 75 milliliters tetralin and 75 milliliters nitrobenzene. The flask contents are heated to and maintained at reflux temperature for 8 hours. During the 8-hour period, approximately 18 grams of water and 9 milliliters of an organic fraction distill from the reaction flask and are condensed in the product trap. The organic distillate contains tetralin, nitrobenzene and aniline. Upon completion of the reaction period, the flask contents are removed and analyzed and found to contain 25 grams aniline, 10 grams azobenzene, 15 grams naphthalene and 5 grams N-phenyl-alpha-naphthylamine.

Example 2

A 250 milliliter flask equipped with a Dean Stark trap is charged with 0.5 gram ammonium perrhenate, 3 grams triphenlyphosphine, 1 gram potassium hydroxide, 50 grams naphthalene, 50 milliliters nitrobenzene and 75 milliliters aniline. The flask contents are heated to gentle reflux for 48 hours. About 9 milliliters of water are distilled. The flask contents are filtered and to the filtrate is added heptane to precipitate a mixture of N-phenylnaphthylamine, naphthoquinone dianil, and dianilino naphthalene along with azobenzene.

Example 3

A 500 milliliter flask fitted with a Dean Stark tube is charged with 1 gram ammonium perrhenate, 2 grams potassium hydroxide, 4 grams triphenylphosphine, 50 milliliters decene-1 and 150 milliliters nitrobenzene. The flask contents are heated and refluxed for 16 hours during which 24 grams water are collected overhead. The hydrocarbon fraction remaining after oxidation is analyzed and found to contain a mixture of 1,3- and 1,5-decadienes.

Example 4

When the reaction is repeated using 150 milliliters decene-1 and 50 milliliters nitrobenzene, and an unsaturated amide, N-phenyl decenamide, is formed.

Example 5

When the reaction is performed by refluxing for 16 hours a mixture of 0.5 gram ammonium perrhenate, 1 gram potassium hydroxide, 3 grams triphenylphosphine, 150 milliliters nitrobenzene and 50 milliliters 1-phenyl-3-butene, ketones and amides are obtained.

Example 6

A steel bomb is charged with 0.5 gram ammonium perrhenate, 0.5 gram potassium hydroxide, 3 grams triphenylphosphine, 25 milliliters nitrobenzene and 75 milliliters cyclohexene. The bomb is pressured to 100 p.s.i.g. with nitrogen then heated to and maintained at 220° C. for 25 hours. The bomb is opened and its contents analyzed to find 3 grams of a mixture of cyclohexanone and cyclohexenone.

Example 7

A flask fitted with a Dean Stark tube is charged with 0.5 gram ammonium perrhenate, 0.5 gram potassium hydroxide, 3 grams triphenylphosphine, 75 milliliters nitrobenzene and 150 milliliters pinene (2.7.7-trimethyl-$\Delta^2$-bicyclo[1.1.3]heptane). The flask contents are refluxed for 24 hours. Analysis of the resultant product reveals that 71 grams of oxidation products are formed.

Example 8

The flask is charged with a mixture of 0.5 grams ammonium perrhenate, 1 gram potassium hydroxide, 3 grams triphenylphosphine, 100 milliliters nitrobenzene and 9 grams 1-cecyne. The contents are heated to and maintained at reflux for 8 hours. The contents are then distilled to recover 8 grams of oxidation products.

Example 9

A steel bomb is charged with a mixture of 0.5 gram ruthenium trichloride, 3 grams triphenylphosphine, 60 milliliters butyl amine and 40 milliliters nitrobenzene. The bomb is pressured to 200 p.s.i.g. with nitrogen, then heated and maintained at 225° C. for 6 hours. The bomb contents are distilled to recover distillate fractions containing butenylamine, butenylaniline and N-butyl butenylamine.

Example 10

The bomb is charged with 0.5 gram ruthenium trichloride, 3 grams triphenylphosphine, 15 milliliters dibutylamine and 50 milliliters nitrobenzene. The bomb is pressured to 8000 p.s.i.g. with carbon monoxide, then heated and maintained at 150° C. for 2 hours. The bomb contents are distilled to recover N-butylaniline and butyraldehyde.

Example 11

A 250 milliliter flask fitted with a Dean Stark tube is charged with a mixture of 1 gram ammonium perrhenate, 3 grams triphenylphosphine, 75 milliliters o-nitrotoluene and 75 milliliters dibutylamine. The flask contents are refluxed for 24 hours and then distilled to recover a distillate fraction containing o-N-butyrylaminobenzaldehyde.

Example 12

To the flask is charged a mixture of 1 gram ammonium perrhenate, 2 grams potassium hydroxide, 4 grams triphenylphosphine, 75 milliliters nitrobenzene and 50 milliliters tributylamine. The flask contents are refluxed for 20 hours and then distilled to recover a distillate containing N-butyl-N'-phenyl butyramidine.

Example 13

To a 500 milliliter flask equipped with a Dean Stark tube is added 0.5 gram ammonium perrhenate, 1 gram potassium hydroxide, 3 grams triphenylphosphine, 150 milliliters nitrobenzene and 50 milliliters N-butylbenzene. The flask contents are heated to gentle reflux for 96 hours. There is found 2 grams azobenzene, 1 gram butenylbenzene. The infrared spectrum shows the presence of ketone carbonyl bands and also some alcohol bands.

Example 14

The flask is charged with a mixture of 0.5 gram ammonium perrhenate, 1 gram potassium hydroxide, 3 grams triphenylphosphine, 150 milliliters nitrobenzene and 75 milliliters 2-ethylhexanol. The flask contents are refluxed from 24 hours, then distilled to recover N-phenyl-1-ethylhex-2-enoyl amide.

Example 15

The flask is charged with a mixture of 0.5 gram ammonium perrhenate, 1 gram potassium hydroxide, 3 grams triphenylphosphine, 150 milliliters nitrobenzene and 50 milliliters 1-chlorooctane The flask contents are refluxed for 24 hours, then distilled, and 45 grams of oxidation product are recovered.

Example 16

A 100 milliliter flask fitted with a Dean Stark tube is charged with 0.5 gram ammonium perrhenate, 1 gram potassium hydroxide, 3 grams triphenylphosphine, 40 milliliters nitrobenzene and 50 milliliters alpha-tetralone. The flask contents are refluxed for 1 hour and then extracted with 50 milliliters benzene to recover a filtrate that is analyzed by chromatography to reveal a mixture of naphthol and N-phenyl alpha-naphthylamine.

Example 17

A 250 milliliter flask equipped with a Dean Stark trap is charged with 0.5 gram ammonium perrhenate, 1 gram potassium hydroxide, 70 milliliters nitrobenzene, 70 milliliters aniline and 50 milliliters dibutylamine. The flask contents are refluxed for 20 hours. A distillate is obtained which comprises 40 percent water and 40 percent butylamine. The flask contents are distilled to recover 20 grams of N-phenylbutyramide and some butyramidines.

Example 18

A 250 milliliter flask equipped with a Dean Stark tube is charged with 0.5 gram ammonium perrhenate, 1 gram potassium hydroxide, 70 milliliters nitrobenzene, 70 milliliters aniline, 50 milliliters dibutylamine and 3 grams tributylphosphine oxide. The flask contents are heated at gentle reflux for 20 hours. An aqueous mixture of butylamine comprising 21 grams is obtained. The flask contents comprise about 30 grams of N-phenylbutyramide and butyramidines.

Example 19

A 250 milliliter flask equipped with a Dean Stark tube is charged with 0.5 gram ammonium perrhenate, 3 grams triphenylphosphine, 1 gram potassium hydroxide, 50 milliliters dioctyl ether, 70 milliliters aniline and 70 milliliters nitrobenzene. The flask is heated at gentle reflux for 20 hours during which oxidation occurs.

Example 20

A 500 milliliter flask equipped with a Dean Stark trap is charged with 0.5 gram ammonium perrhenate, 3 grams triphenylphosphine, 1 gram potassium hydroxide, 75 milliliters aniline, 50 milliliters hexanoic acid and 50 milliliters nitrobenzene. The flask contents are heated to gentle reflux for 24 hours. An aqueous distillate comprising about 18 grams of water is recovered. The flask contents are found to contain unsaturated amides.

Example 21

A 250 milliliter flask equipped with a Dean Stark trap is charged with 0.5 gram ammonium perrhenate, 1 gram potassium hydroxide, 3 grams triphenylphosphine, 31 grams nitrobenzene, 46 grams aniline and 73 grams dimethyl succinate. The flask contents are heated at gentle reflux for 16 hours. Some N-phenyl maleimide is formed.

Example 22

A 500 milliliter flask equipped with a Dean Stark tube is charged with 0.5 gram ammonium perrhenate, 3 grams triphenylphosphine, 50 milliliters cyclohexane carbonyl chloride, 70 milliliters nitrobenzene and 1 gram potassium hydroxide. The flask contents are heated at gentle reflux for 16 hours. Copious quantities of hydrogen chloride are evolved and 10 milliliters of water distills. The flask contents are extracted with acetone and from the filtrate is obtained benzanilide.

Example 23

A 500 milliliter flask equipped with a Dean Stark trap is charged with 0.5 gram ammonium perrhenate, 3 grams triphenylphosphine, 2 grams potassium hydroxide, 80 grams diphenyl, 75 milliliters aniline and 40 milliliters nitrobenzene. The flask contents are heated at reflux for 24 hours and about 16 milliliters of water is condensed. The flask contents are concentrated at 1 milliliter pressure to 70° C. to leave 132 grams of concentrate. The infrared spectrum shows mono- and disubstitute aromatics with the only signfiicant function group being NH, consistent for phenyl substituted diphenyl amines.

Example 24

A 250 milliliter flask equipped with a Dean Stark trap is charged with 0.5 gram ammonium perrhenate, 3 grams triphenylphosphine, 2 grams potassium hydroxide, 50 milliliters phenol, 50 milliliters nitrobenzene and 75 milliliters aniline. The flask contents are heated at reflux for 16 hours and some 10 milliliters of water is distilled. There is identified in the flask contents p-anilinophenol.

Example 25

A 250 milliliter flask equipped with a Dean Stark tube is charged with 0.5 gram ammonium perrhenate, 0.5 gram potassium hydroxide, 3 grams triphenylphosphine, 50 milliliters 4-amylpyridine and 75 milliliters nitrobenzene. The flask contents are heated at reflux for 24 hours and some 12 grams of water is collected. The flask contents are identified as containing aromatic ketones by infrared spectroscopy.

Example 26

A 500 milliliter flask equipped with a Dean Stark trap is charged with 0.5 gram ammonium perrhenate, 0.5 gram potassium hydroxide, 3 grams triphenylphosphine, 100 milliliters nitrobenzene and 100 milliliters aniline with 75 grams cyclohexanone. The contents are heated at reflux for 6 hours and some 39 grams of water is evolved. There is found both diphenylamine and dianilino benzene in the flask contents.

Example 27

The flask is charged with 50 milliliters dibutylamine, 70 milliliters aniline, 70 milliliters nitrobenzene, 0.5 gram ammonium perrhenate, 1 gram potassium hydroxide and 3 grams tributylphosphine oxide. The flask contents are heated to and maintained at reflux temperature for 20 minutes, then cooled and 30 grams of amide products are obtained.

Example 28

The preceding example is repeated with the omission of the tributylphosphine oxide. There is obtained 30 grams of a crude product mixture containing amides and quanidines.

The preceding examples are intended solely to illustrate preferred reagents and modes of practice and are not intended to be construed as unduly limiting of the invention. While the preceding examples (except Example 11) illustrate use of the presently preferred oxidant, nitrobenzene, similar oxidations can be achieved by substitution of an equivalent molar quantity of any of the other oxidants disclosed herein, e.g., nitronaphthalene, nitroanthracene, nitrophenanthrene, 6-nitrol-1-naphthol, m-nitroacetophenone, ethyl-p-nitrobenzene. When oxidants are used which are solid at ambient temperatures or at the reaction temperature, they can suitably be dissolved in an inert solvent such as heptane and the resultant solution can be added to the reaction flask.

The preceding examples (except Examples 9–11) illustrate use of the presently preferred base, potassium hydroxide. It is of course apparent that equivalent amounts of the other bases disclosed herein can be substituted for the preferred base. A volatile base such as ammonia is preferably used under pressure sufficient to retain the ammonia in the liquid phase by use of a steel bomb or autoclave.

The presently preferred catalyst comprises a perrhenate salt or a ruthenium salt in complex association with triphenylphosphine and, accordingly, the preceding examples show use of these catalysts. Similar results, however, can be attained by use of any of the other forms of catalysts disclosed herein and equivalent amounts of other forms (by weight of metal) can be substituted for the salts used herein. Thus metallic rhenium or ruthenium can be added to the flask or bomb contents or the catalytically active metal can be deposited on a support, e.g., 0.5 weight percent rhenium or carbon, 2.5 weight percent ruthenium or alumina, and the supported catalyst can be added to the reaction flask or bomb.

It is intended that the invention be defined by the reagents and steps, and their obvious equivalents, set forth in the following claims.

I claim:
1. An oxidizing composition comprising:
   (1) a oxidant having from 6 to about 20 carbons and having the following formula:

$$(R)_m(NO_x)_nAr$$

wherein:
   Ar is monocyclic, bicyclic or tricyclic aromatic;
   $x$ is 1 to 2;
   $n$ is from 1 to 3;
   $m$ is from 0 to 3; and
   R is the same or different groups selected from hydrogen, hydroxy; halo, and $C_1$ to about $C_8$ acyloxy, acyl, alkylamido and alkoxycarbinol;
   (2) from about 0.01 to about 10 weight percent, calculated as the metal, of a ruthenium or rhenium containing catalyst a catalyst selected from the group consisting of ruthenium metal, rhenium metal, salts and oxides thereof, and a complex thereof with a biphyllic ligand having the formula:

$$E(R)_3 \text{ or } O{=}E(R)_3$$

wherein:
   E is arsenic or phosphorus;
   R is the same or different hydrocarbyl group selected from the class consisting of aryl having from 6 to about 10 carbons and alkyl having from 1 to about 10 carbons; and
   at least one of said R groups is aryl; and
   (3) from about 0.01 to about 20 weight percent of an alkaline material selected from the class consisting of alkali metal and alkaline earth metal hydroxide and ammonia.

2. The composition of claim 1 wherein said catalyst is an ammonium or alkali metal perrhenate.

3. The composition of claim 1 wherein said catalyst is a complex of said ligand and ruthenium.

4. The composition of claim 3 wherein said ligand is a triarylphosphine.

5. The composition of claim 4 wherein said triarylphosphine is triphenylphosphine.

6. The composition of claim 1 wherein said oxidant is nitrobenzene.

7. The composition of claim 1 wherein the catalyst is present at a concentration from 0.1 to about 5 weight percent.

8. The composition of claim 5 wherein said oxidant is nitrobenzene.

9. The composition of claim 1 wherein said alkaline material is present in an amount from 1 to about 5 weight percent.

10. The composition of claim 3 wherein an excess amount of said ligand is present, from 2 to 100 times the stoichiometric amount present in said complex.

References Cited

UNITED STATES PATENTS 3,461,149    8/1969    Hardy et al. _____ 260—645
3,609,195    9/1971    Fields _____ 260—645

LEON D. ROSDOL, Primary Examiner

I. GLUCK, Assistant Examiner

U.S. Cl. X.R.

252—95, 459; 260—645